US008781148B2

(12) United States Patent
Minarik et al.

(10) Patent No.: US 8,781,148 B2
(45) Date of Patent: Jul. 15, 2014

(54) HEADPHONE HAVING INTEGRATED CORD STORAGE

(75) Inventors: Ryan Andrew Minarik, Ladera Ranch, CA (US); Michael DiTullo, Carlsbad, CA (US); Quinn Slater Huffstetler, San Francisco, CA (US); Cormac Eubanks, San Francisco, CA (US); Anthony Meredith, San Francisco, CA (US)

(73) Assignee: DEI Headquarters, Inc., Vista, CA (US)

( * ) Notice: Subject to any disclaimer, the term of this patent is extended or adjusted under 35 U.S.C. 154(b) by 0 days.

(21) Appl. No.: 13/620,798

(22) Filed: Sep. 15, 2012

(65) Prior Publication Data

US 2014/0079275 A1 Mar. 20, 2014

(51) Int. Cl.
*H04R 25/00* (2006.01)
*H04R 1/10* (2006.01)
*H04R 5/033* (2006.01)
*H04M 1/15* (2006.01)

(52) U.S. Cl.
CPC .............. *H04R 1/1033* (2013.01); *H04R 5/033* (2013.01); *H04R 1/1008* (2013.01); *H04M 1/15* (2013.01)
USPC ............................ 381/384; 381/370; 381/374

(58) Field of Classification Search
CPC .. H04R 1/1066; H04R 1/1016; H04R 1/1008; H04R 1/1058; H04R 1/1033; H04R 5/033; H04R 5/0335; H04M 1/05; H04M 1/15; H04M 1/6041
USPC .......... 381/370, 374, 375, 376, 384; 379/430, 379/438; 242/378, 378.1; 455/569.1, 575
See application file for complete search history.

(56) References Cited

U.S. PATENT DOCUMENTS

| 5,832,098 | A | * | 11/1998 | Chen ............................. 381/370 |
| 6,480,611 | B2 | | 11/2002 | Hashimoto et al. |
| 6,937,725 | B2 | * | 8/2005 | Liao ............................. 379/438 |
| 7,372,974 | B2 | | 5/2008 | Yanagishita et al. |
| 2004/0125977 | A1 | * | 7/2004 | Hong et al. ................... 381/376 |

OTHER PUBLICATIONS

"Cable Turtle Organizer", CableOrganizer.com, http://www.cableorganizer.com/cable-turtle/, screen capture Jan. 4, 2013.

* cited by examiner

*Primary Examiner* — Huyen D Le
(74) *Attorney, Agent, or Firm* — Fish & Tsang LLP

(57) ABSTRACT

The present inventive subject matter provides a headphone with a cord support that permits storage of a cord. The headphone can be moved between a closed configuration and an open configuration through extension or eversion of a headphone element or elements. In the open configuration, a structure or a surface is exposed that provides a support for winding and storage of the cord.

17 Claims, 6 Drawing Sheets

HEADPHONE HAVING INTEGRATED CORD STORAGE

FIELD OF THE INVENTION

The field of the invention is a headphone for use with portable audio players and similar devices, in particular to a headphone having a facility for storage of a cord.

BACKGROUND

The following background discussion includes information that may be useful in understanding the present inventive subject matter. It is not an admission that any of the information provided herein is prior art or relevant to the presently claimed inventive subject matter, or that any publication specifically or implicitly referenced is prior art.

As the popularity of portable audio devices and mobile phones configured to play audio files grows, the use of headphones is similarly increasing. Such headphones typically provide a pair of small speakers to be placed directly over the user's ears, and give a more accurate reproduction of sound in addition to blocking unwanted background noise. The majority of headphones utilize a long conductive cord or cable to interface with the audio device in order to permit the user to place the audio device in a variety of locations. However, when not in use, the user is left with the problem of safely storing this long, and often fragile, cord. In headphones that do not include a headband, a similar cord could connect the speakers and poses similar issues.

While a headphone could be provided in a case that provides a space for stowing a cord, such cases are often misplaced. A more practical solution would be to provide a structure for safe storage of the cord on the headphone itself U.S. Pat. No. 6,480,611 describes a headphone with a device that winds the cord, which provides input from the audio device about a spring-loaded reel, which is encased in a housing that also includes a speaker. This reel mechanism includes a spiral spring, which is brought under tension when the cord is pulled from the headphone by the user. This tension is subsequently used to retract the cord back into the housing following use. The mechanism includes a safety device that prevents inadvertent retraction of the cord while the headphones are in use. U.S. Pat. No. 7,372,974 describes a similar stereo headphone arrangement, which includes two housings that each enclose a speaker and a spring driven reel mechanism for storing a cord, where one housing is used for storage of a cord that provides input from the audio device and the other is used for storage of a cord that connects the speakers to one another.

While providing a convenient location for storage of headphone cords, these approaches have inherent limitations. Such spring-driven rotary mechanisms are complex and prone to failure, and the use of a closed housing leaves a user with little recourse should the mechanism become jammed or the cord tangled within. In addition the force that can be provided by such a compact spring-driven mechanism is limited, necessitating the use of a small diameter, pliant cord. Such small diameter cords are not only mechanically fragile and easily tangled, the relatively high resistance of the small diameter conductor encased therein can result in signal losses that degrade an audio signal. Also, such devices lack the flexibility to provide storage for accessory devices such as cord extensions or Y connectors, which are frequently added by users for use in sharing the output of an audio player with a second set of headphones.

These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

Thus, there is still a need for a device that could be incorporated into a headphone that provides safe and reliable storage of a cord that is tolerant of cord tangling and is capable of supporting a variety of cord configurations.

SUMMARY OF THE INVENTION

The inventive subject matter provides apparatus, systems and methods by which one could store cords or cables on a headphone. The headphone includes a multi-part headphone assembly that has an open position and a closed position. In the open position, a structure that supports a cord (a cord support) is revealed and made accessible. Once made accessible, a user could utilize the cord support to safely store the cord by, for example, winding it about the cord support.

In one aspect of the inventive subject matter, the headphone includes a base structure (a base) that is associated with enclosing structure (a cup). The base and the cup are located proximal to one another to at least partially enclose a supporting structure for a cord (the cord support). The base could be located medially and the cup could be located laterally relative to the center of the headphone. The headphone has an open position in which the base and at least a portion of the cup are distant from one another relative to the closed position. In the open position the cord support is accessible to the user. The cord can thus be loaded onto the cord support by the user when the headphone is open, for example, by winding, where it can be stored safely. Some embodiments could incorporate a rotatable joint between the medial base and the lateral cup, which can serve to simplify winding of the input cord. The cord can be stored with the headphone in an open position. Alternatively, the headphone can be closed after the cord is stored on the cord support, thereby providing cord storage in the closed position. In other aspects of the inventive subject matter, the headphone could provide cord storage in either the open position or the closed position. The cord support can be a distinct structure. Alternatively, all or part of the cord support could be formed from a portion of a structure that also serves another purpose, for example the cup or the base. The base could also serve as a support for a speaker.

It is contemplated that the cord support is an extendable or telescoping structure that is placed between the base and the cup. When extended the cord support moves the headphone assembly to the open position. Similarly, when retracted the input cord support moves the headphone assembly to the closed position.

The cup could be made of any suitable material(s), including for example, (1) a pliant or flexible material, such as a soft plastic natural rubber, silicone rubber, impregnated fabrics, a silicone, a rubber, a leather, a fabric, a foam padding or a vinyl, or (2) a hard or rigid material, such as a hard plastic, a metal, a steel or a ceramic. When in the closed position, the cup could define a space that restricts access to a portion of cup's surface, for example forming an approximately hemispherical half shell that restricts access to an inner surface. Eversion of the pliant cup could move the headphone assembly from the closed position to the open position. A portion of the previously inaccessible inner surface of the cup could then serve as a cord support.

Some aspects of the inventive subject matter could include a cord with one or more plugs that could serve as connections with an audio player. In such embodiments the headphone could include a structure to support the plug (a plug support), such as a socket, clamp, or similar device, which could be located on the base the cup, or any other part of the headphone assembly. In still other aspects of the inventive subject mater, the headphone includes a microphone.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
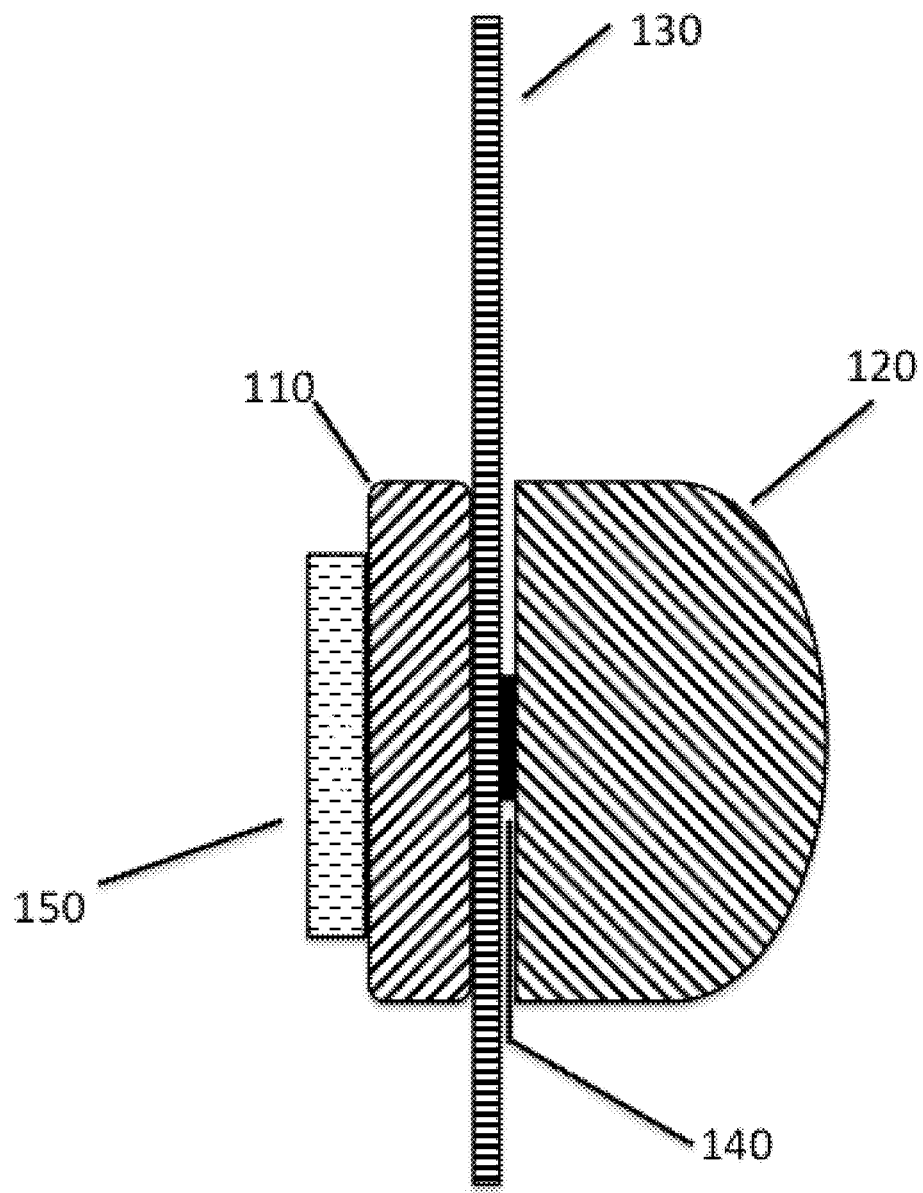
FIG. 1 schematically depicts an embodiment of the inventive subject matter in a closed position, with the support for supporting or winding of a cord unexposed.

It should be noted that while the following description is drawn to a headphone that could be used with a portable audio player or similar device, various alternative configurations are also deemed suitable and could apply to various personal listening devices operating individually or collectively. Such devices could, for example, be utilized for interpersonal communication or as an aid to the hearing impaired.

One should appreciate that the disclosed devices provide many advantageous technical effects including high reliability, tolerance of tangles or other irregularities in the cord to be stored, utility with a variety of cord types and configurations, and utility with user-added accessories.

The following discussion provides example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

In one embodiment of the inventive subject matter, the headphone includes a structure that serves to house a support or winding structure (a cord support) for a cord associated with the headphone. The cord could be connected to the headphone coupled to the headphone via a jack. The cord could be an audio input cord that serves to carry an audio signal from the audio player to a speaker portion of the headphone. Alternatively, the cord could serve as a connection from one speaker to another speaker of the headphone. The structure that houses the support can have multiple parts, the relative positions of which can be configured to define an open position and a closed position. For example, such a structure could have a base and a cup. In such an embodiment the base and the cup could serve as a support of other structures of the headphone (e.g. a speaker, a microphone, an indicator light). In other embodiments, the cup could serve to enclose all or a portion of the cord support. In still other embodiments, portions of the cup could also form part of the cord support. In the closed position the base and the cup are in close proximity. In such an arrangement the cord support could be partially or completely enclosed. In the open position at least a portion of the cup is moved away from the base, thereby exposing the cord support. Once exposed, the user is able to store the cord on the cord support, for example by winding it about the cord support. The headphone could include a rotating or swiveling joint in order to facilitate winding of the cord about the cord support. In some embodiments the base and the cup could be returned to the closed position once the cord has been stored, thereby enclosing and providing further protection for the cord, or a portion thereof.

Figure 2:
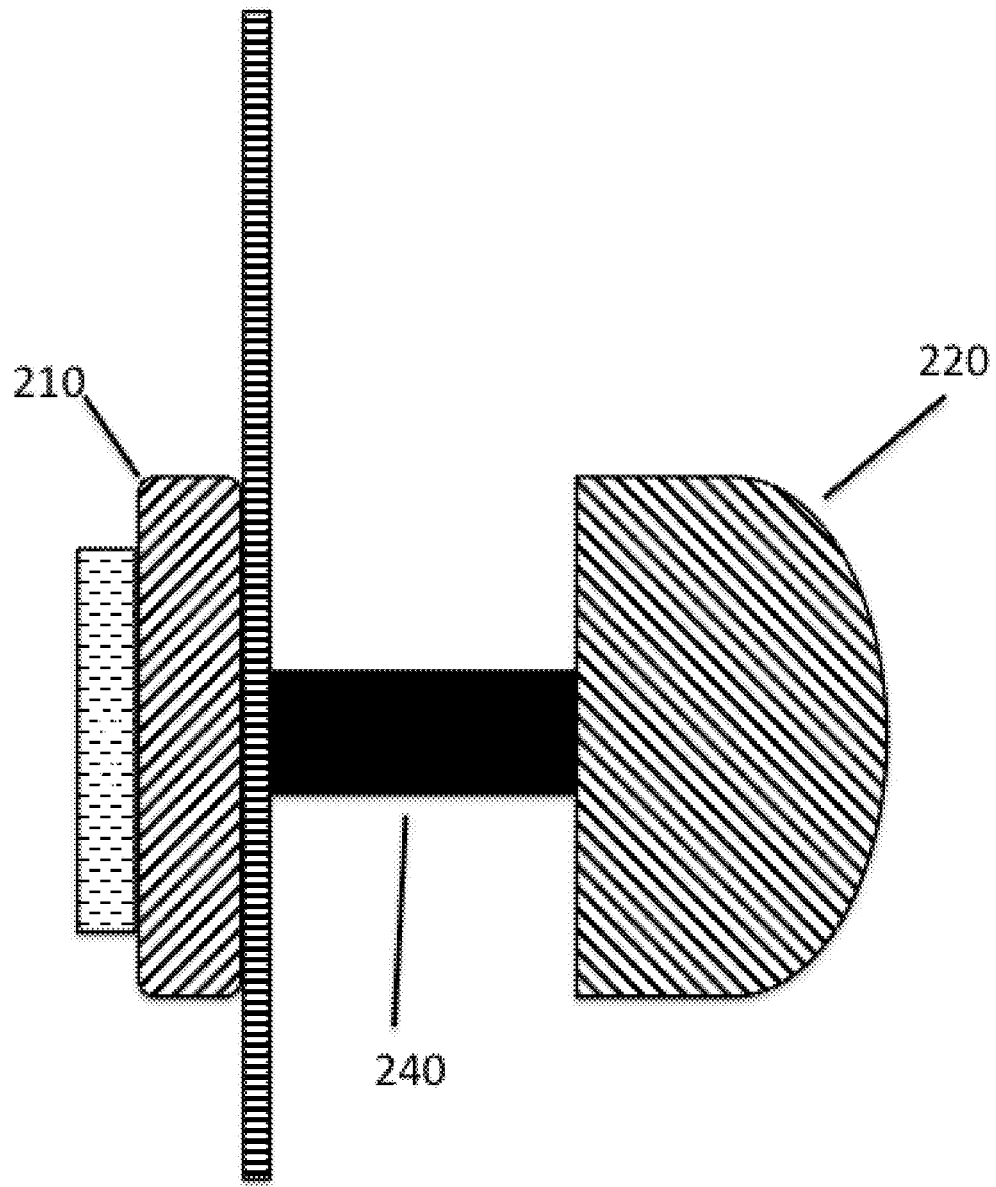
FIG. 2 schematically depicts the headphone shown in FIG. 1 in an open position. Extension exposes the cord support, making it accessible for winding and storage of a cord.

One embodiment of the inventive subject matter is shown in FIG. 1 and FIG. 2. FIG. 1 shows the structure that houses the cord support in the closed position. A base 110 is shown positioned medially relative to the center of the headband, forming a medial base. A cup portion 120 is shown positioned laterally relative to the center of the headband, forming a lateral cup. The cord support 140 is enclosed and not readily accessible by the user. A gap between the base 110 and the cup 120 could be present when the headphone is in the closed position; in such an embodiment the cord could extend through this gap when the headphone is in use. In some embodiments a speaker 150 is affixed to the base. The cord could be removably coupled to the base 110 through a jack. In some embodiments the cup could be configured to reflect sound and thereby enhance the acoustic performance of the headphone. In other embodiments the headphone includes a headband (partially shown as 130) that partially encircles the user's head and provides stability; in such embodiments the headband 130 could be interposed between the base 110 and the cup 120, with the cord support 140 traversing an aperture (not shown) in the headband 130. The headphone could include a microphone, which could be affixed to the base 110 or to the cup 120.

As used herein, the term "headphone" is used broadly to include for example, (1) a device having a headband and two speakers, (2) a headband and one speaker, (3) two speakers coupled via a cord or cords (e.g., not having a headband, having a headband, etc.), or (4) a single speaker and cord.

FIG. 2 shows the headphone of FIG. 1 in the open position. The headphone could transition from the closed position to the open position by extension of the cord support 240. The cord support can be a post extended by any suitable means, including but not limited to a set of telescoping or sliding joints, a screw mechanism, or a set of hinged segments. Extension of the cord support 240 moves the cup 220 laterally from the base 210, exposing the cord support 240 and making it accessible to the user. Once exposed, the cord (not shown) could be wound around the cord support. In some embodiments the headphone could be returned to the closed position once the cord has been stored, enclosing the stored cord. In other embodiments the cord is stored with the headphone in the open position. In some embodiments a rotating or swiveling joint is associated with the cord support 240 to assist in winding the cord. Advantageously, small tangles in the cord do not interfere with such a mechanism, and since the user has access to the device, tangled and fouled cords could be easily rectified. Additionally, since the amount of cord that could be stored in this fashion is not limited to the space available inside of a housing, and preferably does not rely on a spring mechanism, this arrangement advantageously permits the use of large diameter cords, or even flatter and wider cords, that could be more mechanically durable or have relatively large conductive elements that are acoustically desirable. Similarly, extensions and other cord accessories added by the user can be readily accommodated.

Figure 3:
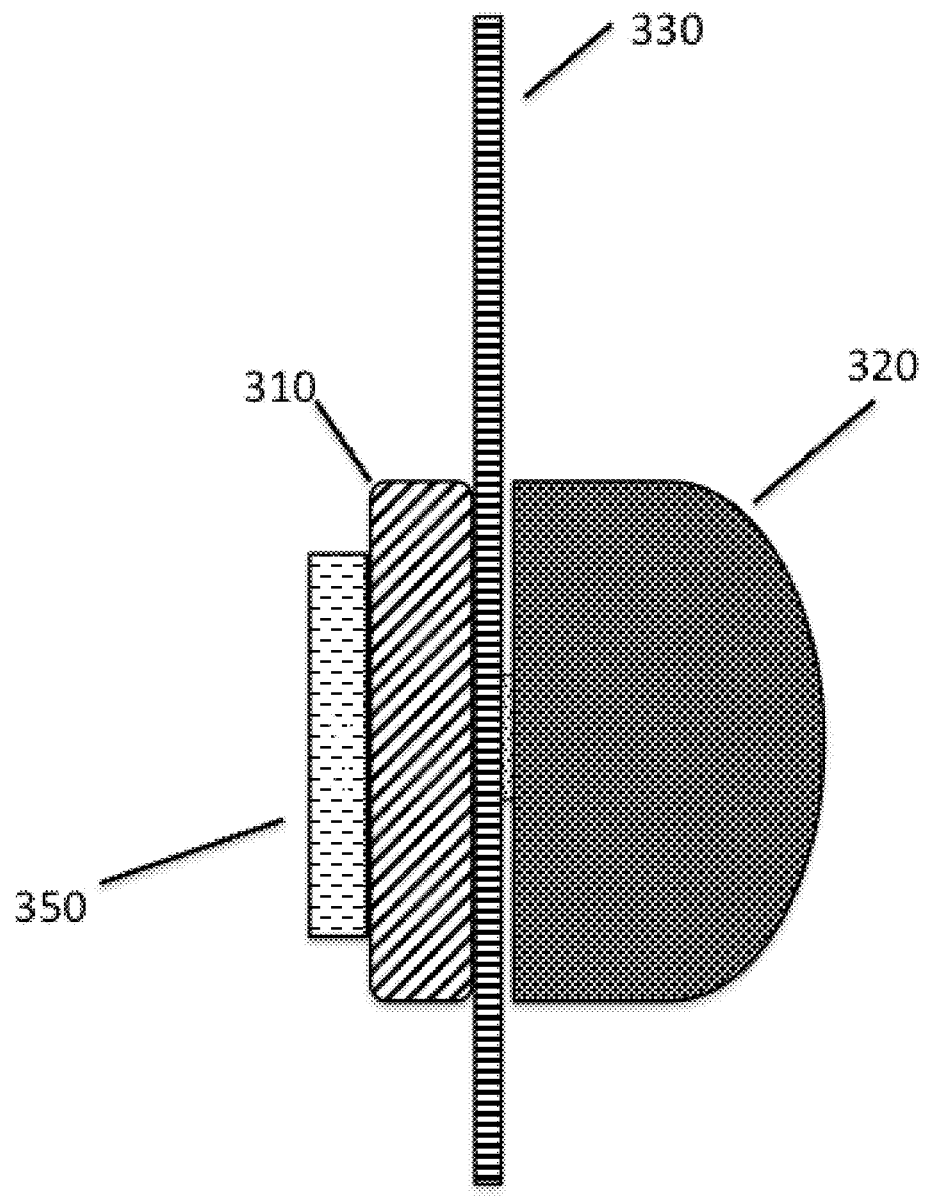
FIG. 3 schematically depicts another embodiment of the inventive subject matter in a closed position, which conceals a support used for winding a cord. The outermost portion of the headphone is comprised of a flexible or pliant material.

Another embodiment of the inventive subject matter is shown in FIG. 3. FIG. 3 shows the structure that houses the cord support in the closed position. A base 310 is shown positioned medially relative to the center of the headband, forming a medial base. A cup portion 320 is shown positioned laterally relative to the center of the headband, forming a lateral cup. The cup 320 could be composed, in whole or in part, of a pliable material that permits it to be everted. A gap between the base 310 and the cup 320 could be present when the headphone is in the closed position; in such an embodiment a cord (not shown) could extend through this gap when the headphone is in use. In some embodiments a speaker 350 is affixed to the base 310. The cord could be removably coupled to the base 310 through a jack. In some embodiments the cup 320 could be configured to reflect sound and thereby enhance the acoustic performance of the headphone. In other embodiments the headphone includes a headband 330 that partially encircles the user's head and provides stability; in such embodiments the headband 330 could be interposed between the base 310 and the cup 320. The headphone could include a microphone, which could be affixed to the base or to the cup.

Figure 4:
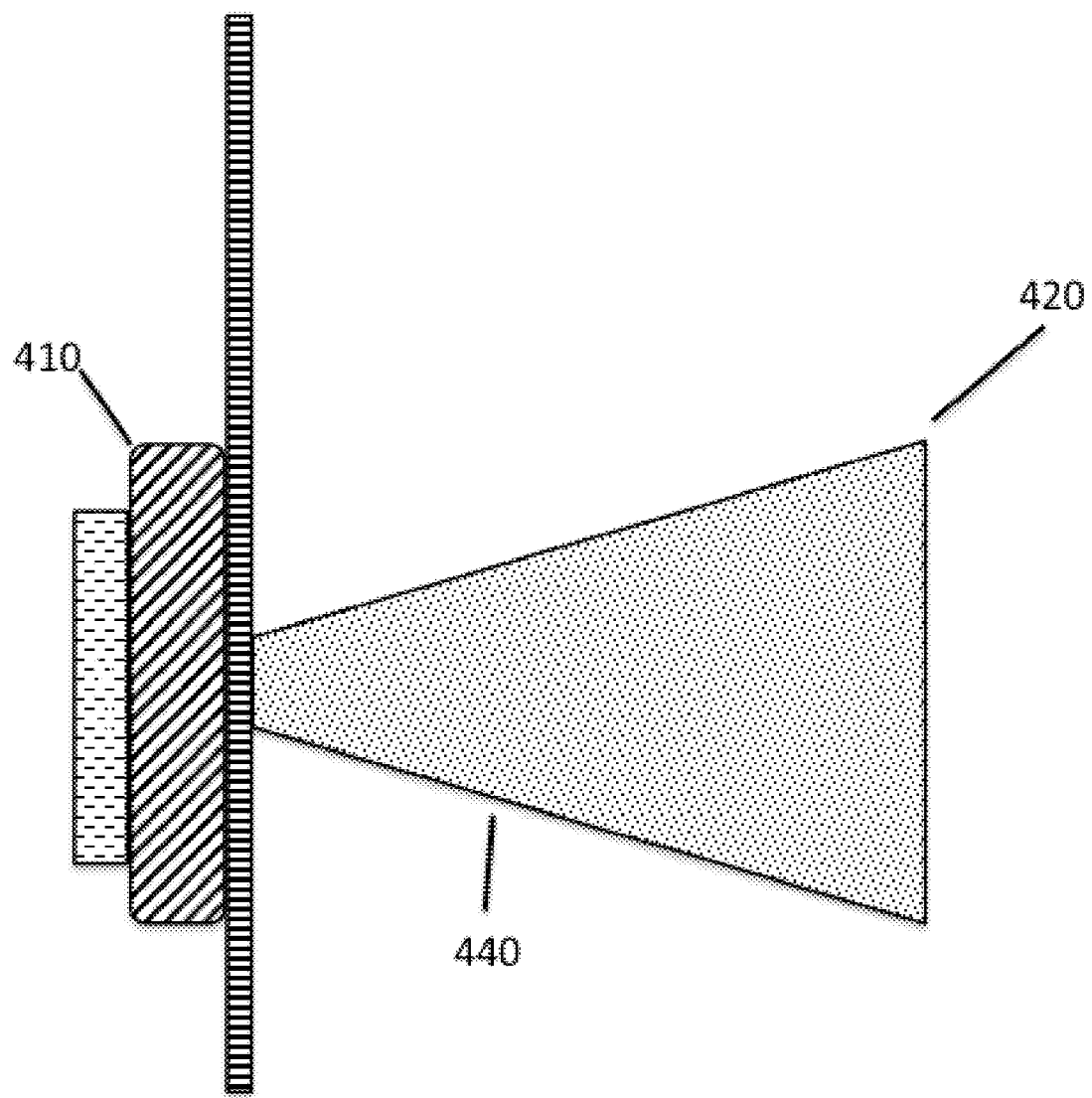
FIG. 4 schematically depicts an embodiment of the inventive subject matter in an open position. The pliant nature of the outermost portion of the headphone allows it to be everted, forming an approximately conical projection that extends outward. This projection is used for winding or storage of a cord.

FIG. 4 shows one embodiment of the inventive subject matter in an open position. A headphone could transition from the closed position to the open position by eversion of the cup 420. Eversion of the cup extends the portion immediately proximate to the base away from the base 410 and exposes the interior surface 440 of the cup 420, making it readily accessible to the user. In such an embodiment the interior surface 440 or a portion thereof becomes the cord support. Once exposed, the cord (not shown) could be wound around the cord support 440. In some embodiments the headphone could be returned to the closed position once the cord has been stored, enclosing the stored cord. In other embodiments the cord is stored with the headphone in the open position. A rotating or swiveling joint could be associated with the cup 420 in order to assist in winding the cord.

Figure 5:
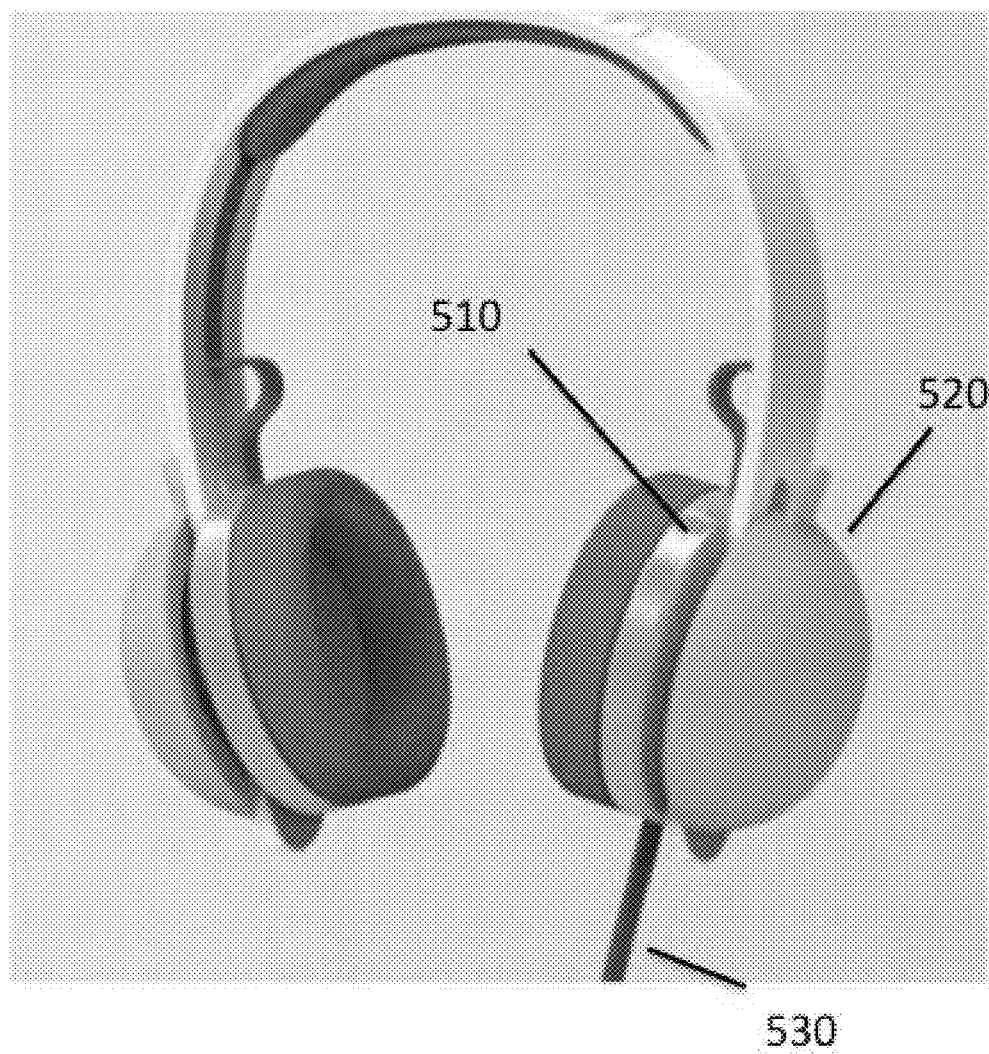
FIG. 5 illustrates an embodiment of the inventive subject matter in the closed position. The cord is extended for use.
Figure 6:
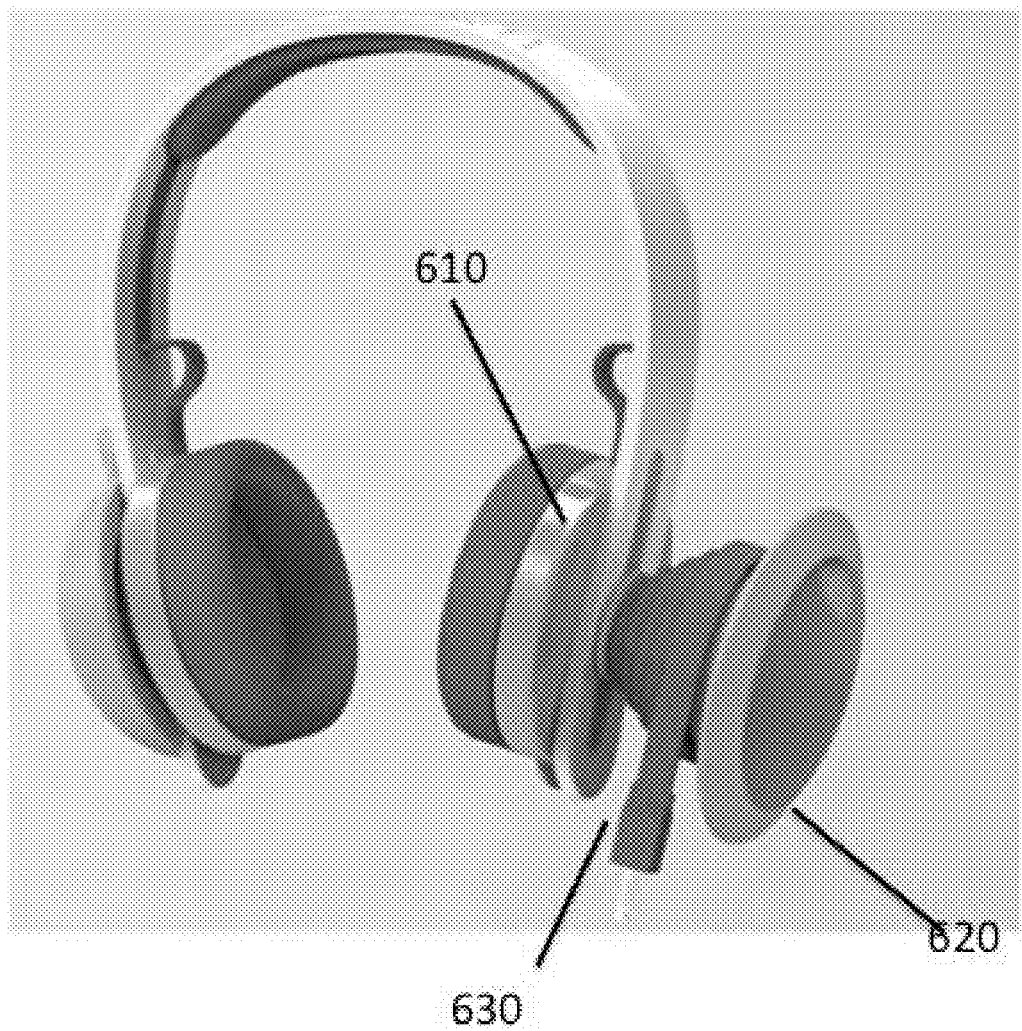
FIG. 6 illustrates an embodiment of the inventive subject matter in the open position. The cup has been everted, exposing an inner surface about which the cord is wound for storage.

FIG. 5 illustrates a perspective view of another embodiment of the inventive subject matter in a closed position and in use. The headphone has a base 510 and a cup 520 that are in close proximity and at least partially enclosing a cord support structure (not shown), with the cord 530 exiting through a small gap to provide a connection with an audio player. The cup 520 is approximately hemispherical and is made of a pliant material that permits it to be everted. This can be seen in FIG. 6, which shows the headphone of FIG. 5 in the open position. Eversion of the cup 620 moves a portion of the cup laterally relative to the base 610. This exposes the inner surface of the cup (obscured by the cord in this figure) to act as a support for the cord 630, which could be would around the cord support.

While the cups in FIGS. 1-6 are shown as approximately hemispherical, it is appreciated that a variety of other shapes could be suitable. These include, but are not limited to, cylinders, cones, ellipsoids, spheroids, polyhedra, frustoconical, and irregular geometric shapes.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps could be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A multi-part headphone assembly comprising;
    a base structure, a cup, a cord, a cord support, and a speaker directly affixed to the base;
    wherein the headphone is configurable between an open position and a closed position by movement of at least a portion of the cup relative to the base;
    wherein the speaker is sized and dimensioned for placement directly over an ear of a user when the speaker is directly affixed to the base;
    wherein the cord support is at least partially enclosed by the cup; and
    wherein the cord is configured to at least partially wind about the cord support when the headphone is in the closed position.

2. The headphone of claim 1, wherein the cup comprises a pliant material, and wherein the headphone is transitioned from the closed position to the open position by eversion of the cup.

3. The headphone of claim 2, wherein the pliant material comprises at least one of a silicon, a rubber, and a fabric.

4. The headphone of claim 1, wherein the cord support comprises a post that couples the base and the cup.

5. The headphone of claim 1, wherein the headphone assembly is transitioned from the closed position to the open position by retraction of the cup away from the base.

6. The headphone of claim 1, further comprising a rotatable joint interposed between the base and the cup.

7. The headphone of claim 1, further comprising a microphone affixed to the base.

8. The headphone of claim 1, further comprising a microphone affixed to the cup.

9. The headphone of claim 1, wherein the cup includes an outwardly extending post.

10. The multi-part headphone assembly of claim 1, further comprising a headband coupled to the base and configured to be worn on a head of the user.

11. A headphone comprising:
   a medial base, a lateral cup, a cord, and a cord support;
   wherein the headphone is configurable between an open position and a closed position by movement of at least a portion of the lateral cup relative to the base;
   wherein the cord support is at least partially enclosed by the lateral cup;
   wherein the cord configured to at least partially wrap about the cord support when the headphone is in the closed position; and
   wherein the lateral cup comprises a pliant material, and wherein the headphone is transitioned from the closed position to the open position by eversion of the lateral cup.

12. The headphone of claim 11, wherein the cord support comprises a post that couples the base and the cup.

13. The headphone of claim 11, further comprising a rotatable joint interposed between the base and the cup.

14. The headphone of claim 11, further comprising a microphone affixed to the base.

15. The headphone of claim 11, further comprising a microphone affixed to the cup.

16. The headphone of claim 11, wherein the cup includes an outwardly extending post.

17. The headphone of claim 11, wherein the pliant material comprises at least one of a silicon, a rubber, and a fabric.

* * * * *